(12) United States Patent
Spengler

(10) Patent No.: US 9,144,943 B2
(45) Date of Patent: Sep. 29, 2015

(54) FIBER MOLD FILLING SYSTEM AND METHOD

(75) Inventor: Gerhard Spengler, Frankfurt am Main (DE)

(73) Assignee: OLBRICH GmbH, Bocholt (DE)

( * ) Notice: Subject to any disclaimer, the term of this patent is extended or adjusted under 35 U.S.C. 154(b) by 716 days.

(21) Appl. No.: 13/396,745

(22) Filed: Feb. 15, 2012

(65) Prior Publication Data

US 2013/0207292 A1    Aug. 15, 2013

(51) Int. Cl.
| | |
|---|---|
| *B29C 43/04* | (2006.01) |
| *B29C 43/14* | (2006.01) |
| *B29C 70/30* | (2006.01) |
| *B29C 43/56* | (2006.01) |
| *B29C 43/52* | (2006.01) |
| *B29C 43/00* | (2006.01) |
| *B29C 43/02* | (2006.01) |
| *B29C 70/54* | (2006.01) |

(52) U.S. Cl.
CPC ............ *B29C 70/305* (2013.01); *B29C 43/006* (2013.01); *B29C 43/02* (2013.01); *B29C 43/04* (2013.01); *B29C 43/14* (2013.01); *B29C 43/52* (2013.01); *B29C 43/56* (2013.01); *B29C 70/542* (2013.01); *B29C 2043/144* (2013.01)

(58) Field of Classification Search
CPC ...... B29C 43/006; B29C 43/02; B29C 43/52; B29C 43/56; B29C 2043/144; D04H 1/22; D04H 17/00
See application file for complete search history.

(56) References Cited

U.S. PATENT DOCUMENTS

| | | | |
|---|---|---|---|
| 3,520,750 A | 7/1970 | Li et al. | |
| 4,806,298 A | 2/1989 | Wilkinson et al. | |
| 5,492,662 A * | 2/1996 | Kargol et al. | 264/119 |
| 5,942,175 A | 8/1999 | Curran et al. | |
| 6,458,299 B1 | 10/2002 | Wierer et al. | |
| 7,540,307 B1 * | 6/2009 | Khambete | 141/5 |
| 7,622,062 B2 | 11/2009 | Forster | |
| 2005/0140059 A1 | 6/2005 | Ernst et al. | |
| 2006/0208379 A1 * | 9/2006 | Khambete et al. | 264/46.8 |
| 2007/0007695 A1 | 1/2007 | Forster | |

FOREIGN PATENT DOCUMENTS

| | | |
|---|---|---|
| DE | 35 41 073 | 5/1986 |
| DE | 199 18 343 | 10/2000 |
| DE | 103 24 735 | 11/2004 |

(Continued)

*Primary Examiner* — Yogendra Gupta
*Assistant Examiner* — Joseph Leyson
(74) *Attorney, Agent, or Firm* — W. F. Fasse

(57) ABSTRACT

A fiber filling box divided into compartments by slotted divider walls, preferably comb-like divider fences with vertical tines extending downwardly from a top frame, is lowered onto an air-permeable conveyor over at least one vacuum box in a fiber filling station. A multi-axis controlled nozzle blows fiber material to different depths and/or densities in the individual compartments. The divider fences allow continuous intertwining of fibers between adjacent compartments, but sufficiently contain the fibers to maintain well-defined boundaries between different fiber depths and/or densities in the individual compartments. Hold-down plates are lowered onto the fiber material, the fiber filling box is lifted away, and then the hold-down plates are lifted to release a shaped fiber mass, which is then heated and compacted in a heating station to form a fiber preform. The hot fiber preform is then molded, compressed and cooled in a molding station to produce a molded fiber component.

26 Claims, 11 Drawing Sheets

(56) References Cited

FOREIGN PATENT DOCUMENTS

| | | |
|---|---|---|
| DE | 102005004454 | 10/2006 |
| EP | 0 549 809 | 7/1993 |
| EP | 1 437 435 | 7/2004 |
| EP | 1 478 498 | 2/2010 |
| WO | WO 2004/106042 | 12/2004 |

\* cited by examiner

FIBER MOLD FILLING SYSTEM AND METHOD

FIELD OF THE INVENTION

The present invention relates to an apparatus and a method for producing a three-dimensionally shaped fiber mass, and to an apparatus and method for further processing the shaped fiber mass to produce molded fiber components.

BACKGROUND INFORMATION

In various fields or industries, three-dimensionally molded components are produced by arranging a mass of fibrous material, and then heating, press-molding and cooling the fibrous mass to produce the molded fiber component. In the automobile industry such three-dimensionally molded components of fiber material are used as interior finish and trim components, as a backing for such finish and trim components, and especially also as sound insulation or noise damping components for motor vehicles. For example, such molded fiber components are used as fire wall insulation to damp engine noise, and as a floor sound insulation or floor pan liner to damp road noise, drive train noise and other driving noises. These components also offer thermal insulation for the passenger compartment of the motor vehicle. Such acoustic damping or insulating components are also used in the motor vehicle trunk, head liner, door paneling or trim, package shelf and engine compartment. It has been found to be especially suitable to produce such sound insulation components as molded fiber components by three-dimensionally molding a fiber fleece material. These molded fiber components especially consist of thermally deformable (e.g. thermoplastic) synthetic fibers, or of a mixture of natural fibers and/or thermoset fibers together with thermoplastic fibers.

These molded fiber components are to be fabricated as rather large surfacial parts, which are correspondingly to be applied over large surface areas of the motor vehicle, such as the floor pan and the head liner. However, over their relatively large surface area, these components often must include distinct sub-areas that have different thicknesses and/or different densities of the fiber material, in order to achieve different sound-damping and sound-insulating characteristics at the corresponding different locations of the motor vehicle. It is further necessary that such molded components should be as light-weight as possible so as to avoid unnecessarily increasing the weight of the motor vehicle, or requiring an excessive amount of fibrous raw material and therefore unnecessarily increasing the manufacturing costs. Thus, it has become important to be able to fabricate such a molded fiber component with a precisely targeted variation of the thickness and the density of the fiber material in different sub-areas, to precisely meet the requirements respectively pertaining for the different sub-areas. It is also often necessary that such molded fiber components must include openings or cut-out areas for accommodating or fitting other parts of the motor vehicle.

It has long been known in the automotive industry that such molded fiber components with varying thicknesses and varying densities in different sub-areas can be produced by providing a uniform fiber base or substrate, and laying-up extra layers or blocks of fiber material onto the fiber base in particular areas that require a greater thickness and/or greater density of the fiber material. During the molding process, the additional fiber layers or blocks are adhesively bonded and laminated onto the fiber base, and the whole assembly is three-dimensionally molded at an elevated temperature, and then cooled to set or fix the molded configuration. Any required openings are cut-out thereafter by stamp-cutting, water jet cutting, or the like. Such a process is disadvantageous in view of the significant additional labor steps and associated extra cost.

To avoid the need for laying-up individual layers and/or blocks of fiber material, improved methods and apparatus have been developed, whereby a fiber fill material of loose fibers or strands is blown or sprayed onto or into a mold, which then three-dimensionally molds the accumulated fiber mass at elevated temperature, followed by cooling, in order to produce a fixed three-dimensionally molded fiber component. In this regard, see U.S. Pat. Nos. 5,942,175, 4,806,298 (as well as the related German Patent laying-open document DE 35 41 073), and U.S. Pat. No. 7,622,062 (as well as the related WO 2004/106042 and DE 103 24 735 and US 2007/0007695). Generally, these documents disclose similar basic aspects of a method and apparatus for producing a three-dimensionally molded fiber body. A mold including a lower mold tool and one or more upper mold tools with various different three-dimensionally contoured mold surfaces of perforated sheet metal is filled with a fiber mixture by blowing or streaming the fiber mixture into the mold. For example, this is achieved via a movably controlled fiber fill pipe into an open mold, or via a fiber injection nozzle into a closed mold. Then a hot airstream at about 200° C. is blown through the accumulated fiber material between the upper and lower mold tools, such that the synthetic plastic fibers of the fiber mixture partially melt and/or such that thermosetting binder materials are activated, whereby the meltable thermoplastic materials or the thermosetting materials form a binder for the other fibers of the fiber mixture. The fiber mixture is then three-dimensionally molded under pressure between the mold tools. Thereafter cooling air is blown through the molded fiber body in the mold so as to cool, stabilize and fix the molded shape of the resulting fiber pre-form. The fiber pre-form and/or the mold tools can be moved among various stations, e.g. a filling station, a heating station, and a cooling station, by a rotary table arrangement or by a linear slide table arrangement.

The abovementioned conventional methods and systems for producing three-dimensionally molded fiber components all suffer several disadvantages. It is especially a problem that these known methods have not been able to satisfactorily achieve the desired variation of the thickness and/or density of the fiber material at different sub-areas of the molded component, with sufficient accuracy and sufficient economy. Namely, the placement and positioning of the desired fiber quantity and fiber density in the different sub-areas, in relation to the prescribed molding contour, is rather complicated and difficult, and also rather inaccurate as to the location, especially at the areas of transitions of thickness or density, for example at transitions of the molding contour with a thickness jump from a small wall thickness (e.g. 8 mm) to a significantly larger wall thickness (e.g. 40 to 60 mm). Due to a rather inaccurate blowing-in or streaming-in of the fibers with an airstream while simultaneously applying vacuum suction in the three-dimensionally contoured mold tool, this leads to an excessive accumulation and layering or superposition of the applied fiber quantity in such areas of a contour transition. As a result, only rather inaccurate surface densities and thicknesses of the molded component can be achieved especially in the areas of contour transitions. It has not been possible to achieve an exactly determined position of such transitions of the thickness and/or the density of the applied fiber quantity, with precise boundaries between adjacent sub-areas having different thicknesses and/or densities. Furthermore, the need of a subsequent cutting step to produce the required holes or openings in the molded fiber component entails additional costs, due to the additional handling, additional equipment, additional tooling, and additional work steps. This disadvantageously increases the cost of producing the finished molded component. A further disadvantage is that the fiber material is introduced, heated, consolidated or compressed and molded, and finally cooled in the same mold tool, which thus requires this mold tool to be repeatedly heated and cooled. That in turn leads to a relatively high energy consumption and also relatively long mold tool and process step cycle times. Still further, the application of a vacuum through a perforated sheet metal mold tool, over the entire area of the component to be molded, leads to a relatively high consumption of the vacuum suction airflow, which again leads to relatively high energy consumption.

To achieve some improvement over such disadvantages of the above prior art, another fiber molding method and apparatus has also become known in the industry. In this method and apparatus, a perforated sheet metal molding shell is positioned on top of a conveyor belt. Vacuum is applied via a vacuum box to the upper side of the perforated molding shell selectively through plural trap-door vacuum valves that individually communicate with different segments of the perforated molding shell. The loose fiber fill material is blown horizontally into the space between the conveyor belt and the upper mold shell, while vacuum is applied successively sequentially through the individual trap-door vacuum control valves to successive sequential areas or segments of the mold shell beginning at the far end away from the fiber blow-in entrance. Thereby, the amount of vacuum airflow can be somewhat reduced, and the successive filling of the mold chamber with the fiber material successively from one end to the other is facilitated and made more uniform. While this produces a fiber mass with different thicknesses in different sub-areas, corresponding to the configuration of the upper mold shell, it is not possible to accurately produce significantly different fiber densities at different areas with distinct or crisp transitions of the fiber density precisely at predefined locations. After the molding shell is filled with fibers in this manner, the molding shell is lifted away, and the resulting fiber mass is transported by the conveyor belt into a hot air oven, where the fibers are heated and partially melted. After the heating process, the fiber mass is transported into a separate cooled mold station including upper and lower mold tools, between which the hot fiber mass is three-dimensionally molded into the desired final contoured shape and cooled so as to fix and stabilize this contoured shape. Thus, this process and apparatus involve a division of the processes into three distinct process cycle steps and three distinct stations, namely the first step and station for forming the fiber mass, the second step and station for heating the fiber mass, and the third step and station for the final molding and cooling of the fiber mass to form the fiber pre-form. This separation of the heating and cooling achieves economic advantages, because the total energy required for the heating and cooling can thereby be reduced. Nonetheless, the disadvantage remains, that it is not possible to achieve the desired variation of the thickness and density of the fiber mass with good precision especially at the predefined locations of the transitions of the thickness and/or density between adjoining sub-areas of the fiber pre-form that is to be produced.

SUMMARY OF THE INVENTION

In view of the above, it is an object of the invention to provide a method and an apparatus for producing a three-dimensionally shaped fiber mass that has different thicknesses and/or different densities at different sub-areas thereof. More particularly, it is an object of the invention to produce such a shaped fiber mass that has sharp distinct boundaries between different areas having different thicknesses and/or densities. It is another object of the invention to provide a method and a system for further processing such a shaped fiber mass to produce a fiber preform and then a molded fiber component that has different thicknesses and/or different densities at different sub-areas thereof. A further object of the invention is to reduce the energy required for heating, cooling and vacuum suction generation for producing such molded fiber components. Another object of the invention is to provide a method and an apparatus with a basic standard configuration that can be easily adapted to the particular configuration, dimensions, densities and other requirements of various shaped fiber masses and molded fiber components that are to be produced, either by simple tool exchange, or even without requiring a tool exchange but rather merely reprogramming. A further object of the invention is to reduce the amount of fiber material waste at areas where a throughhole is to be cut through the molded component. The invention also aims to be able to optimize the amassing or filling of fibers to achieve the optimum fiber distribution for the required thickness, density, noise damping properties, and other characteristics as needed in different areas of the molded fiber preform, and thereby minimize the required amount of fiber material. Still further, it is an object of the invention to provide an overall integrated system for producing such shaped fiber bodies and further processing them to produce finished molded fiber components. The invention further aims to avoid or overcome the disadvantages of the prior art, and to achieve additional advantages, as apparent from the present specification. The attainment of these objects is, however, not a required limitation of the claimed invention.

The above objects have been achieved according to the invention in a fiber filling apparatus for producing a shaped fiber mass having sub-areas or segments with respective different thicknesses and/or different densities of the fiber material. A significant component of the inventive apparatus is a compartmentalized mold box or fiber filling box that has an open top, an open bottom, a preferably solid outer perimeter wall and at least one slotted inner divider wall that divides the space within the perimeter wall into at least two compartments. The slotted divider wall has vertically extending open slots, and is preferably configured and embodied as a comb-like divider fence comprising vertical tines, pickets or rods extending downwardly zs from top frames or rods that hold the vertical tines. The vertically extending open slots or spaces between the vertical tines are open toward the bottom.

The apparatus further includes a support, preferably comprising an air-permeable conveyor, on which the fiber filling box is vertically liftably arranged, and a controlled movable fiber feed pipe or nozzle through which loose fiber material entrained in an airstream is supplied into the compartments of the fiber filling box. Thereby, the fiber feed pipe or nozzle is controlled, preferably automatically for example by a computer numerical control, to deposit or fill the respective appropriate amount of fiber material into each one of the compartments defined and bounded by the perimeter wall and the comb-like divider fence(s) of the compartmentalized box. Namely, the fiber material can be filled to different heights or depths, and to different densities, respectively within the individual compartments, or even varying within a given compartment. A distinct boundary between adjacent compartments is provided by the comb-like divider fence, which prevents the fibers from spilling or flowing from a higher level in one compartment to a lower level in the neighboring compartment, yet still allows a certain degree of fiber cross-over and intertwining between adjacent compartments. Namely, some of the fibers extend through the open slots or spaces between the vertical tines of the comb-like divider fence. The degree of this intertwining that is to be permitted, and on the other hand the degree to which the spill-over or slumping of fibers from a thicker or higher area to a thinner or lower area, is readily adjusted by appropriately selecting the width, spacing and number of the tines, and the size of each open space or gap between adjacent tines. Preferably at least one vacuum distributor box applies a vacuum suction airflow to the bottom of the air-permeable conveyor as the preferred support. The filling of fiber material into the compartments of the box is thus supported by gravity and by the vacuum suction airflow.

The inventive apparatus further preferably includes a plurality of hold-down members such as plates, with one or more hold-down plates allocated to each one of the compartments of the fiber filling box. After the fiber material has been filled into the box to the respective different required depths in the different compartments, then the segment hold-down plates are lowered into the box so as to press down and pre-compress the fiber material, for example with a different degree of compression and thus a different resulting fiber density in any given one of the compartments. Namely, the segment hold-down plates can be differentially driven downward with different pressures or different stroke distances in order to achieve the different compression and different density of the fiber material in the respective different segment sub-areas of the shaped fiber mass being formed.

In a further alternative or optional step of the method, after a respective compartment of the fiber filling box has been filled with the fiber material, and this first charge of fiber material has been pre-compressed by the respective hold-down plate, then this plate (or all of the plates) can again be retracted upwardly, to allow a secondary filling of the respective compartment with more (i.e. a second charge) of the fiber material. This is followed by a second compression with the respective allocated hold-down plate. Thereby, a higher filling mass and greater compression and greater resulting density of the fiber material can be achieved in any given compartment where needed.

While the hold-down plates are compressing and holding down the fiber material in this manner, the fiber filling box is lifted off of the air-permeable conveyor and away from the pre-compressed fiber material that now forms the three-dimensionally contoured shaped fiber mass. The individual vertical tines of the comb-like divider fence or fences of the fiber filling box easily pull up out of the fiber material, while the hold-down plates hold down the fiber material and wipe or strike off any stray fibers from the tines. Then the hold-down plates are lifted away from the resulting compressed shaped fiber mass, which is next transported by the air-permeable conveyor into a hot air heating station. There the shaped fiber mass is heated by blowing hot air through it, to a temperature at which thermoplastic fibers of the fiber material begin to melt and act as a binder. This forms a heated fiber preform, which is then transported into a molding station in which it is pressed and molded between two mold tools into the final required three-dimensionally molded configuration of the finished molded fiber component. The mold tools are cooled so as to cool, stabilize and fix the molded configuration of the finished molded component, which is then removed from the molding station. The inventive method and apparatus reduce the respective tool cycle times, improve the efficiency, and reduce energy consumption, because each step can be carried out more quickly, by dividing the several processes among several process stations.

The above objects have further been achieved by a method according to the invention, which proceeds generally as just described above. The comb-like divider fence or fences serve to divide the compartments from one another, to ensure that precise boundaries can be established between adjacent sub-areas that are to have different thicknesses and/or densities of the fiber material in the finished molded component. Because the fibers are filled from the top into the compartmentalized fiber filling box, and vacuum suction is preferably applied through the air-permeable conveyor under the box, the fiber filling process is supported by both a vacuum suction and the force of gravity. In preferred embodiments, the apparatus further includes vacuum blocking or control belts, shutters or sliders that control the application of the vacuum suction to only the sub-area being filled at a given time, to thereby reduce the total amount of required suction airflow, and achieve a better control of the fiber fill density individually in each respective sub-area. The vacuum box preferably has at least two vacuum chambers that are independently connected to vacuum suction sources, which further reduces the total required vacuum suction airflow, and further improves the control of the applied vacuum suction.

The one or more fiber feed pipes or nozzles are preferably controllable in at least two axes and preferably three axes of motion, to accurately control the dispensing or feeding of fiber material into the respective compartments of the fiber filling box. This achieves an accurate control and topographic distribution of the thickness and the density of the fiber material over the different sub-areas of the shaped fiber mass to be produced. This also allows a varying fiber fill within a single segmented sub-area, for example to achieve a sloping or varying thickness if needed in a given sub-area.

Also, the fiber material can be completely omitted from any given compartment of the box, to save fiber material waste at this area where a throughhole is to be cut in the finished molded component at this location after molding. A flange rim of fiber material may be formed around the perimeter of such an opening, to allow precision cutting of the opening after molding. Any such sub-area at which an opening is to be formed can be bounded by either solid divider walls or the comb-like tined divider fences with a sufficiently close tine spacing to prevent a spill-out of the fiber material. Thereby, the apparatus and method according to the invention reduce the amount of production waste, by avoiding the waste material of cut-out holes, because the desired hole areas are simply not filled with fiber material in the first place. Nonetheless, the comb-like divider fences between adjacent fiber filled compartments of the box allow sufficient intertwining of the fibers across these boundaries or transitions to ensure that the molded component has a continuous integral one-piece structure, without noticeable dividing breaks between adjacent segment sub-areas of the finished molded fiber component.

While the above described method and apparatus involve preferably a single respective hold-down member configured and allocated respectively for each respective compartment of the fiber filling box, and therewith each respective segment sub-area of the shaped fiber mass and of the finished molded fiber component, in an alternative embodiment the apparatus instead includes a standardized grid or raster of standardized hold-down plates, for example square hold-down plates with dimensions of 50 mm by 50 mm or 100 mm by 100 mm arranged in a regular square grid pattern. With such an arrangement, the segment sub-areas of the shaped fiber mass to be fabricated, and also the locations of the comb-like divider fences, must be laid-out along a standardized raster or grid according to the standardized layout of the hold-down plates. Then it is not necessary to provide a retooling or exchange of the hold-down plates for switching production to a different shaped fiber mass with a different configuration. Instead, it is simply necessary to reprogram which ones of the standardized hold-down plates are driven down at what vertical stroke distance and/or with what hold-down pressure, depending on the requirements of thickness and density of the fiber fill in each respective segment sub-area. If it is necessary for a divider fence to be positioned directly in line with one or more of the standardized hold-down plates, then it is also possible to keep those particular hold-down plates lifted so as not to collide with the divider fence. In this manner, only the compartmentalized fiber filling box needs to be exchanged for switching to production of a different shaped fiber mass with a different configuration, while the standardized hold-down plates merely need to be correspondingly programmed in their operation. In this regard, the lifting and lowering of the hold-down plates can be controlled by a computer numerical control, a mechanical control, an electromechanical control, an electronic control, or the like.

Further embodiments, features and advantages of the invention are disclosed in the following detailed description and in the appended claims.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF EXAMPLE EMBODIMENTS AND THE BEST MODE OF THE INVENTION

Figure 11:
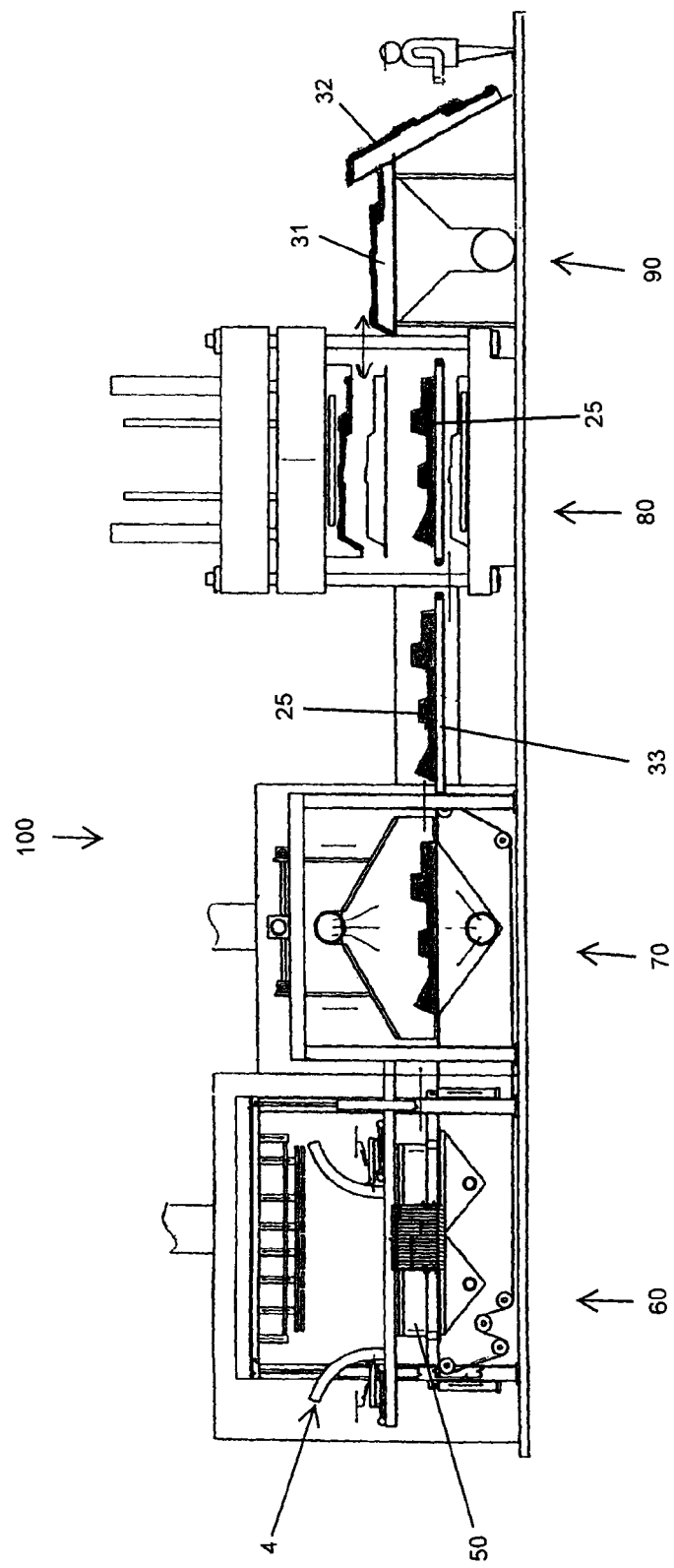
FIG. 11 is a schematic front elevation view of an overall molding system for producing molded fiber components, including a fiber filling station, a hot air heating station, and a molding station.

FIG. 11 gives a general overview of a system 100 for producing three-dimensionally molded fiber components 32 such as floor sound insulation components or floor pan liners to be installed under the floor carpeting on the floor pans of motor vehicle passenger compartments. As generally discussed above, the molded fiber component 32 is made of a fiber material, for example a mixture of synthetic plastic fibers and natural fibers that have been heated, compressed, molded into the required three-dimensional contoured shape and then cooled to form the finished molded component 32. As also discussed above, the molded component is required to have different sub-areas with different thicknesses and/or different densities of the fiber material, in order to achieve the required sound damping and other characteristics at various locations of the component. The component also has at least one hole or opening passing therethrough.

For fabricating the molded fiber component 32, the molding system 100 especially includes a fiber filling station 60 according to the invention. In this fiber filling station 60, loose bulk fiber material 4 is filled into individual compartments or segment sub-areas of a compartmentalized fiber filling box 50. Not shown in FIG. 11 is a fiber preparation station (according to any prior art teachings), in which the loose fiber material is prepared, for example different fiber types are mixed, chopped, loosened, optionally coated or impregnated with a binder, and entrained in a blowing airstream, to introduce the prepared fiber material 4 into the compartmentalized fiber filling box 50, which produces a shaped fiber mass of the fiber material. The fiber filling station 60 is followed by a hot air heating station 70 or oven in which the shaped fiber mass is heated and either held in shape or further molded and compressed to form a hot fiber preform 25, which is then conveyed by a conveyor 33 into a molding station 80, in which a forming press further compresses and molds the hot fiber preform 25 into the final contoured shape of the molded fiber component 32. Then the molded fiber component 32 is cooled and transferred to a removal mold tool, which conveys the molded fiber component 32 to a finished part discharge station 90, where operating personnel remove the finished molded fiber component 32. Further details of each of the stations will be described below.

Figure 1:
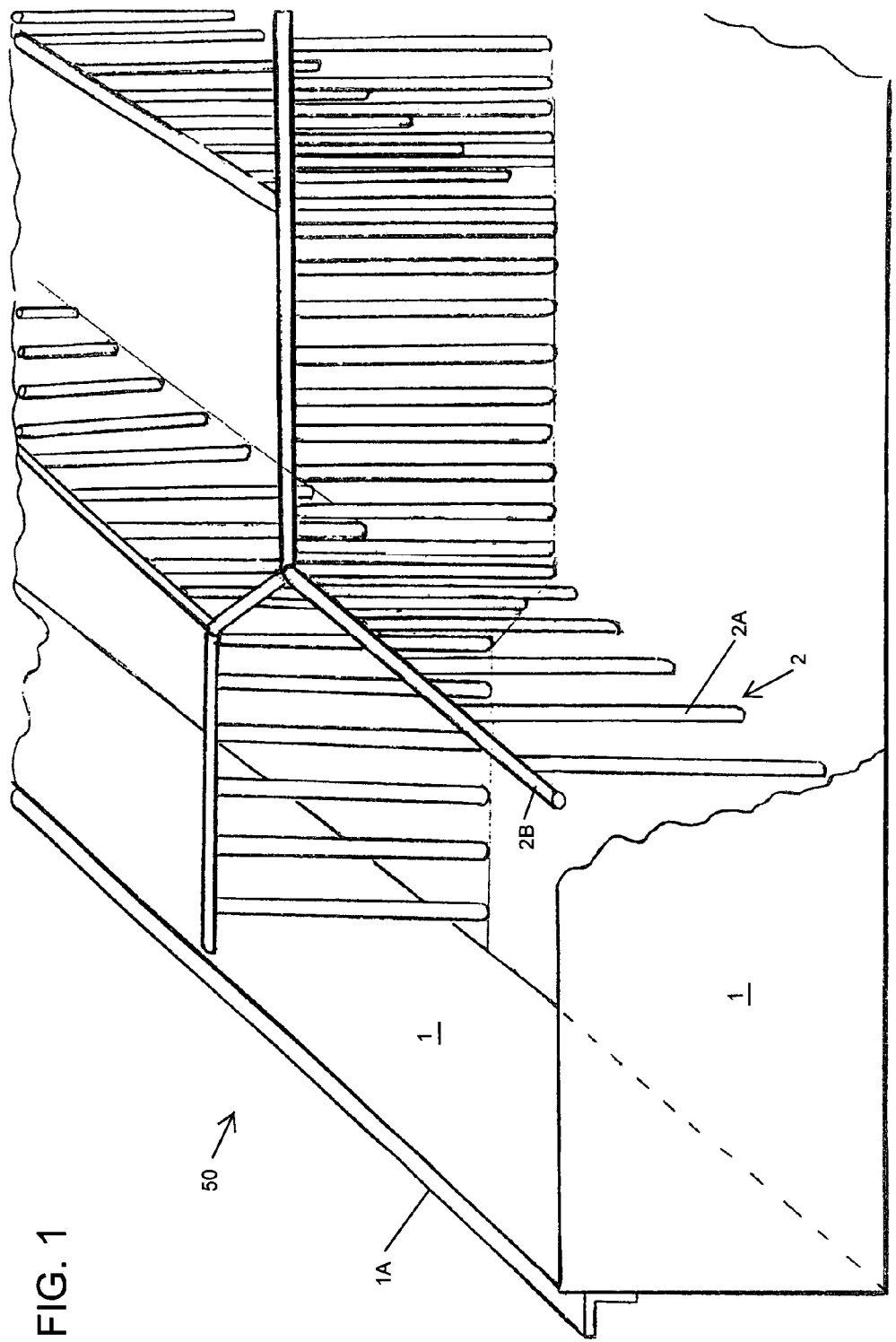
FIG. 1 is a schematic perspective view of a cut-away portion of a compartmentalized fiber filling box according to the invention.

FIG. 1 schematically shows, in a cut-away partial view, the basic construction of the compartmentalized fiber filling box 50 according to the invention. The fiber filling box 50 includes a solid outer perimeter wall 1 and interior slotted divider walls 2, here particularly embodied as comb-like divider fences 2. The solid perimeter wall 1 will positively and cleanly contain the filled-in fiber material 4 without any overflow or spill-out thereof, and will precisely and cleanly define the outer contour of the molded fiber component to be formed. In this regard, it may be desired to include an extra rim or flange of material around the perimeter of the required finished part, to allow for further processing and handling. This extra flange rim for processing or handling may remain on the finished part, or may later be trimmed off to prepare the finished part. The interior comb-like divider fences 2 divide the interior space of the fiber filling box 50 into individual compartments or segmented sub-areas.

In this regard, the divider fences 2 are designed to provide sufficient separation and containment of the fiber material 4, so that the fiber material 4 can be filled to different depths and/or different densities respectively in the separate individual compartments or sub-areas, without significant spill-over or spill-through or slumping of the fiber material from one compartment into the adjoining compartments. On the other hand, the divider fences 2 are designed and configured to allow sufficient fiber flow-through or cross-over and intertwining of fibers reaching through the divider fences 2 between adjacent compartments. This ensures that the resulting shaped fiber mass 4E is a single one-piece integral or unitary fiber body, without separations of the fiber material along the divider fences. To achieve this, each divider fence 2 includes a plurality of vertical tines, pickets or rods 2A that are supported by and extend downwardly from a top frame or rod 2B. The vertical tines 2A can be rods having a round cross-section, or a square or rectangular cross-section, or some other shape. Alternatively, the divider fence can be formed from a solid wall provided with vertically extending open cut-out slots that extend from below the top frame 2B all the way down to the bottom of the divider fence. It is important that the vertically extending open spaces or slots of the divider fence are open to the bottom, to allow the divider fence to be lifted upwardly out of the accumulated fiber mass, without disrupting the fibers that extend through the divider fence openings between adjacent compartments, as will be described below. For this reason, the entire bottom of the fiber filling box 50 is also open, i.e. there is no floor closing the bottom of the box 50 at the bottom of the perimeter walls 1. This allows the entire box to be lifted upwardly away from the accumulated shaped fiber mass 4E as will be discussed below.

Alternatively, the horizontal frame of the divider fence could be provided at the bottom, with the tines extending upwardly, and the slots being open at the top, in an embodiment in which the divider fences are pulled downwardly out of the fiber mass. Such an arrangement is more complex and not preferred, however.

In any event, the width of the individual tines 2A, the number of tines, and the spacing between successive tines can be selected as necessary to achieve the desired degree of fiber cross-over between adjacent compartments, depending on the fiber characteristics and the different thicknesses and/or densities of the fiber material in neighboring compartments of the fiber filling box. For example, the spacing of successive tines is preferably in the range from 20 mm to 60 mm. The solid perimeter walls 1 as well as the divider fences 2 can be made of metal, plastic, wood or composite materials.

The fiber filling box 50 preferably additionally includes a slide-in rail 1A respectively provided on two opposite outer sides of opposite perimeter walls 1, to allow the fiber filling box 50 to be easily carried by a suitable exchange mechanism. This facilitates the exchange of differently configured fiber filling boxes in the fiber filling station 60, for producing different configurations of shaped fiber masses for different molded components to be produced. This exchange is achieved by sliding the respective box 50 onto a support frame 16 (see FIG. 3) of the fiber filling station 60.

Figure 2:
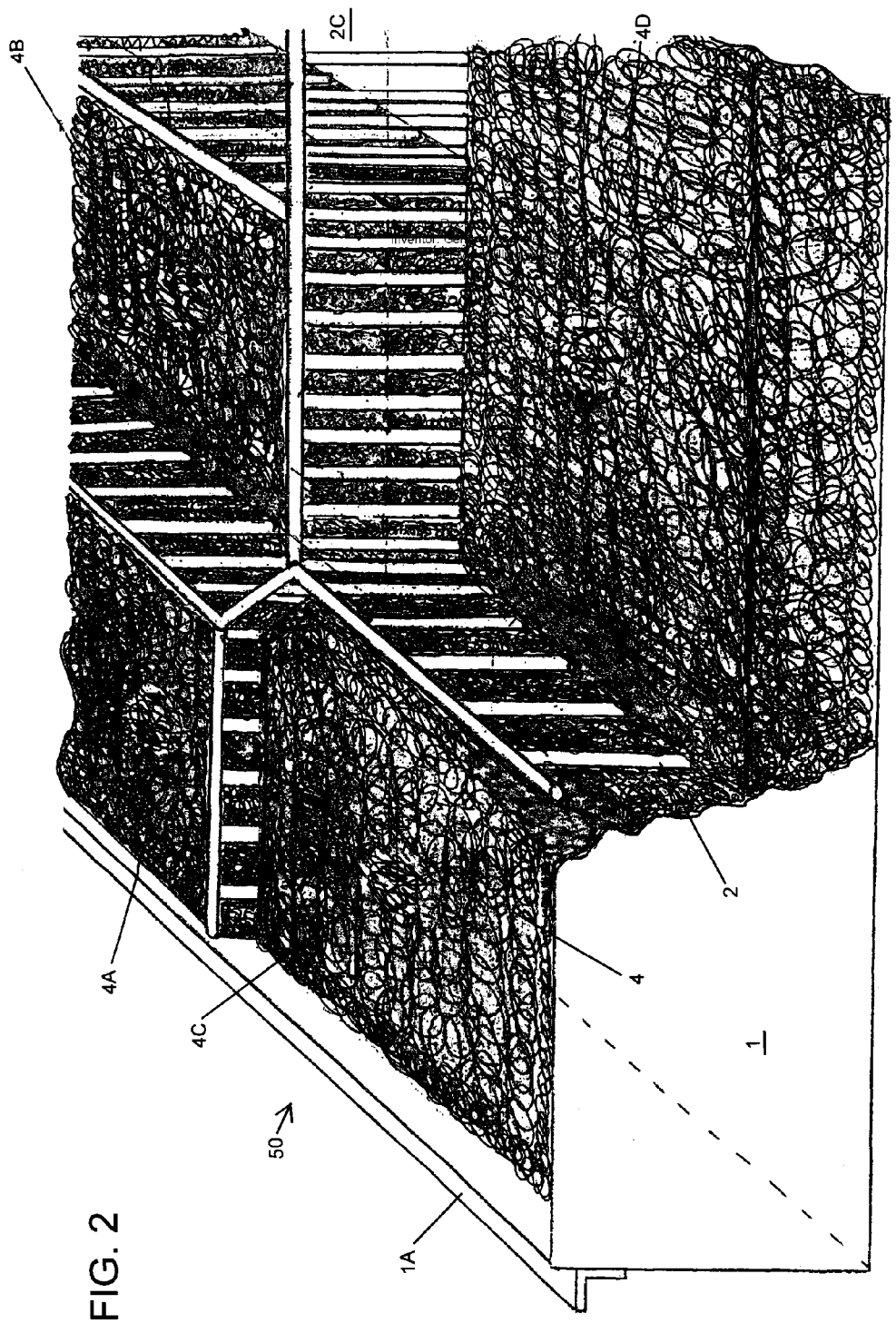
FIG. 2 shows the fiber filling box according to FIG. 1 after it has been filled with fiber material to different depths in different compartments.

FIG. 2 shows the fiber filling box 50 after various compartments thereof have been filled with loose fiber material 4. As can be seen, the various segmented sub-areas of fiber material 4A, 4B, 4C and 4D have been filled to different heights and/or different densities into respective individual compartments of the fiber filling box 50. The different depths and densities of the fiber material 4 in different compartments of the fiber filling box 50 are adapted to the particular requirements of the molded fiber component 32 that is to be produced. Namely, the appropriate amount, density and depth of fiber material 4 is filled into each compartment of the fiber filling box, to achieve the required final thickness and density of the compressed and molded fiber material at each given area of the finished molded component 32 that is to be produced. Thus, the locations of the divider fences 2 have generally been established depending on or corresponding to the boundaries of sub-areas of the finished molded component 32 having different characteristics (e.g. different thickness and/or different density), although it is also possible to achieve a varying thickness and/or a varying density within any given compartment as discussed below.

The divider fences 2 sufficiently contain the fiber material 4 in the respective compartments to establish precise clean boundaries between the adjacent segmented sub-areas 4A, 4B, 4C and 4D of the fiber material 4, while still allowing a sufficient cross-over or flow-through of the fiber material through the open spaces of the divider fences 2 so as to ensure that the resulting shaped fiber mass is a single unitary or integral body of the fiber material extending continuously and intermingled between adjacent ones of the segmented sub-areas 4A, 4B, 4C and 4D. In the upper right area of FIG. 2, it can also be seen that one of the compartments 2C bounded by divider fences 2 has not been filled with fiber material 4. This area 2C will form an opening in the finished molded fiber component, optionally rimmed by a flange of pressed fiber material that will be precision cut after the molding process, whereby omitting fiber material from the area 2C reduces the amount of fiber waste.

Figure 3:
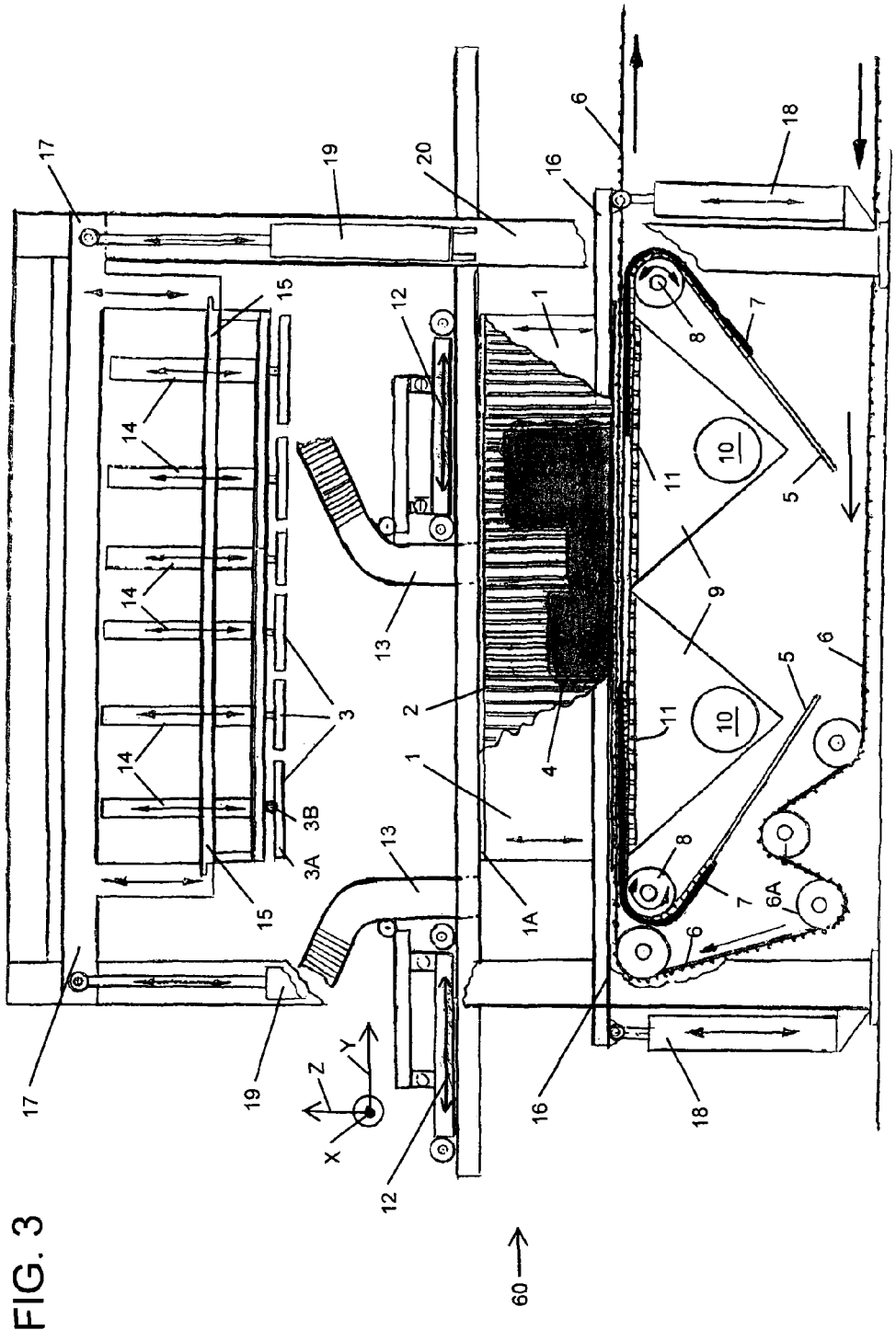
FIG. 3 is a schematic front elevation view of a fiber filling apparatus or station according to the invention, wherein fiber material is being filled to different depths in different compartments of the fiber filling box.

Further details of the fiber filling station 60 are shown schematically in FIG. 3. The compartmentalized fiber filling box 50 is carried by its slide-in rails 1A and slid onto a support frame 16 of the fiber filling station 60. The support frame 16 merely supports the front and rear edges of the fiber filling box 50, so that the bottom of the box remains open and unobstructed. Under the support frame 16, the fiber filling station 60 includes a support, preferably an air-permeable conveyor 6, such as a mesh belt, a metal grate of linked rods, a chain link wire lattice, or the like, which is drivable in a continuous-loop circulating manner over rollers 6A, including idler rollers and at least one drive roller. The conveyor 6 is supported on an air-permeable (e.g. perforated metal) table plate 11.

Under the air-permeable conveyor 6 and table plate 11, there are at least two vacuum boxes 9 independently connected to two vacuum suction supplies 10. In the illustrated embodiment, the two vacuum boxes 9 each respectively apply a vacuum suction airflow to about one-half of the bottom of the fiber filling box 50. This allows a more focused application of vacuum suction to the portion of the fiber filling box being filled at any given time, which thereby allows the suction intensity to be increased, and the total amount of suction airflow to be reduced, which in turn reduces the energy consumption. In this regard, the fiber filling station 60 further includes at least two vacuum control belts 7 arranged above the vacuum boxes 9, either above or below the air-permeable table plate 11, and below the air-permeable conveyor. The vacuum control belts are, for example, constructed in the manner of roller shutters that each comprise a plastic sheet (e.g. polytetrafluoroethylene) that is carried by and slides along guide rails 5, and is selectively driven by deflection and/or drive rollers or sprockets 8. Thereby, the vacuum control belts 7 are selectively moved to cover respective portions of one or both vacuum boxes 9, and thereby open only a focused limited area for suction airflow through the bottom of the fiber filling box 50, i.e. in the area that is being filled with fiber material 4 at any given time. This also increases the suction intensity and makes more efficient use of the available suction airflow.

For filling the fiber material 4 into the individual compartments of the fiber filling box 50, the fiber filling station 60 further includes at least one or preferably at least two fiber feed pipes or nozzles 13, from which the loose fiber material 4 is blown into the fiber filling box 50 in an entraining airstream. Each fiber feed pipe or nozzle 13 is movably carried by a multi-axis drive 12 which controlledly moves the respective fiber feed pipe 13 in at least two directions, i.e. along at least two axes X and Y, and preferably along all three spacial axes X, Y and Z, for example as indicated by the orthogonal axes X, Y and Z in FIG. 3. The actual axes of motion of the multi-axis drive 12 do not have to correspond to the orthogonal spacial axes, but could be oriented at various different angles relative to each other. The important thing is that the respective fiber feed pipe 13 can be moved selectively to each location in the fiber filling box within the operating range of that respective fiber feed pipe. The drives 12 are schematically illustrated as carriages that roll along rails in the Y direction, with a pipe carrying component also shiftable linearly in the X direction, and the feed pipe 13 being raisable and lowerable in the Z direction. Each axis of motion can be controlled and driven by a respective servomotor, for example driving cogged wheels or gears, an acme screw, a screw jack or the like. Alternatively, any multi-axis robotic arm drive mechanism can be used. Preferably the fiber feed pipe 13 also includes a nozzle control valve to selectively increase or decrease the flow rate of the loose fiber material, or the flow rate of the entraining airstream is controllable, to control the rate at which the fiber material is filled into the respective compartment of the fiber filling box 50. The various controllable components are controlled by any suitable control arrangement, but preferably a computer numerical control, which can be programmed to achieve the appropriate fill depth and density in each particular compartment of the compartmentalized fiber filling box 50. The filling density can be influenced to some extent also by adjusting the vacuum suction airflow provided by the vacuum sources 10 through the vacuum boxes 9. As the loose fiber material 4 is filled into the respective compartments of the fiber filling box 50, the fiber material 4 is supported on the air-permeable conveyor 6, which effectively forms the bottom of the fiber filling box, and which in turn is supported on the air-permeable table plate 11.

The flow and settling of the fiber material 4 into the fiber filling box 50 is assisted by both the vacuum suction airflow as well as the force of gravity. Namely, because the fiber filling box 50 is filled from above through the open top of the box, in a downward flow direction, both the entraining airstream in the feed pipes 13 and the suction airflow of the vacuum sources 10 can be reduced (in comparison to an upward filling flow) because of the assistance provided by the downward force of gravity.

Figure 4:
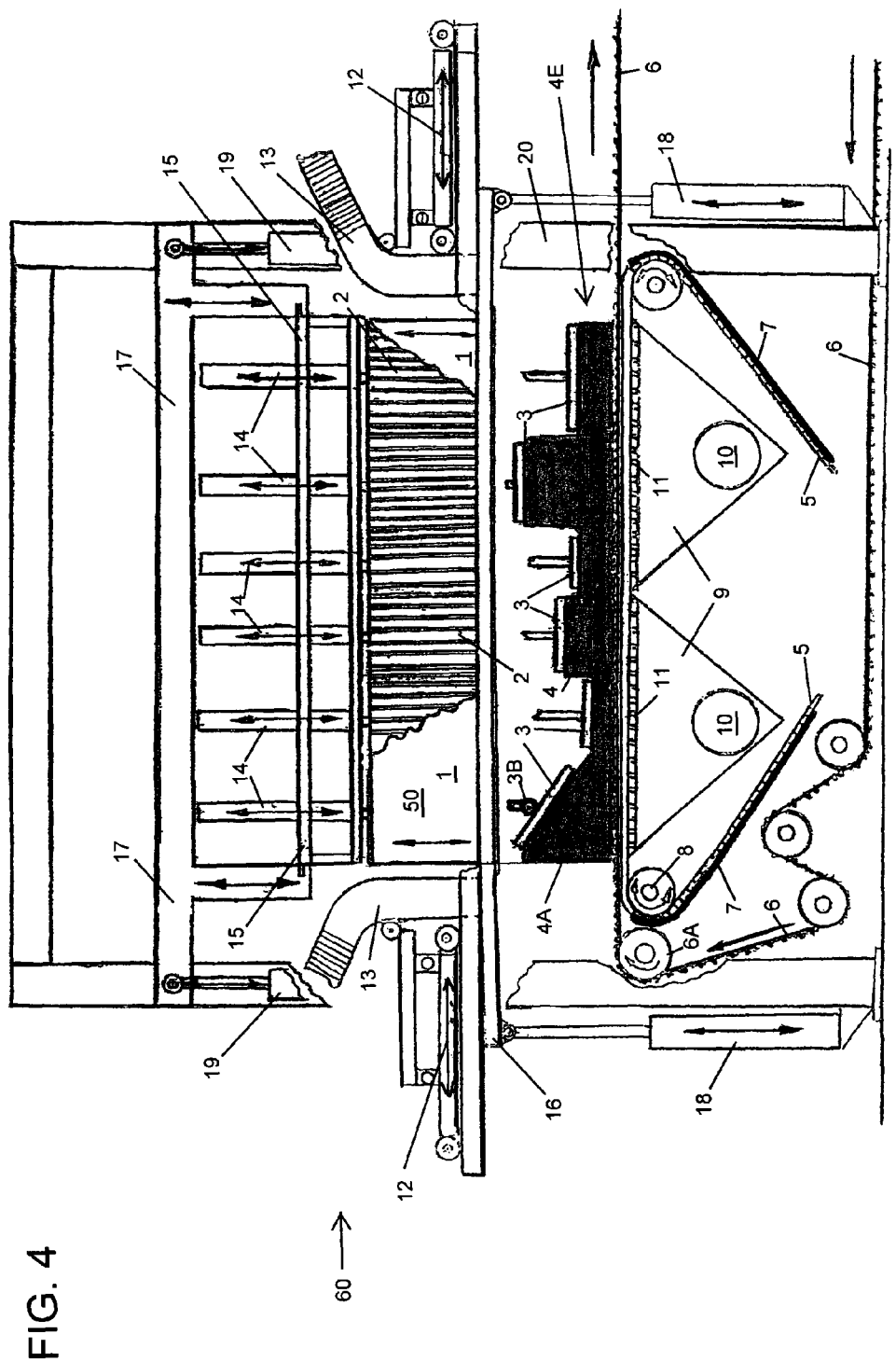
FIG. 4 is a view similar to FIG. 3, but showing a subsequent stage in which hold-down plates are pressing down on the fiber material in the respective compartments of the fiber filling box.

As shown in FIGS. 3 and 4, the fiber filling station 60 further includes a plurality of hold-down plates 3 that are respectively individually allocated to the respective compartments of the fiber filling box 50. Each hold-down plate 3 is secured to a respective independent stroke element 14, preferably by a respective pivot or swivel joint 3B. The stroke elements 14 may each be an active stroke element such as a pneumatic piston-cylinder, an acme screw or a toothed gear rack driven by a servomotor, or any other suitable active linear drive element. Alternatively, the stroke elements 14 can be passive elements that are merely mechanically adjustable to different heights, without being actively driven during a work cycle, in which case the entire active stroke is provided by the stroke elements 19. All of the stroke elements 14 are carried in an exchangeable hold-down system exchange frame 15, which is removably carried in a support frame 17, which in turn is vertically movably carried by the stroke elements 19 (such as pneumatic lift cylinders or any other suitable linear drive elements) relative to a machine frame 20. Thus, the controlled actuation of the stroke elements 19 selectively raises or lowers the support frame 17, which carries the hold-down system exchange frame 15 with its stroke elements 14 and the hold-down plates 3, so as to raise and lower all of the hold-down plates 3 in unison. By their individual adjustment or individual actuation, the independent stroke elements 14 then achieve an independent differential positioning and/or stroke motion of the hold-down plates 3 relative to one another.

In the illustrated embodiment, the hold-down system exchange frame 15 is easily slidable into or out of the support frame 17, to allow a respective set of the hold-down plates 3 to be installed as exchangeable tooling in the fiber filling station 60. Thereby the hold-down plates 3 are configured and arranged to correspond to the dimensions, configuration, location etc. of the several individual compartments of the compartmentalized fiber filling box 50, of which the configuration is specialized for the particular molded component to be produced. Alternatively, the hold-down plates 3 may be dimensioned, configured and arranged according to a standardized fixed grid or raster. For example, each hold-down plate 3 may be a square plate with dimensions of 50 mm by 50 mm or 100 mm by 100 mm, arranged in a square grid pattern. Such a standardized grid or raster of hold-down plates does not need to be exchanged for different product configurations and therewith different configurations of the fiber filling box 50. Instead, one or more of the standardized hold-down plates will be allocated to each compartment of the fiber filling box, and the respective stroke elements 14 merely need to be actuated appropriately corresponding to the requirements of the compartment of the fiber filling box to which they have been allocated. This control can readily be achieved via a computer numerical control of the stroke elements 14. Preferably, the placement of the divider fences 2 of the fiber filling box 50 will be designed to correspond to spaces between adjacent hold-down plates of the standardized grid or raster. But instead, if any of the hold-down plates would collide with the required position of a respective divider fence, then those hold-down plates are simply not driven downwardly but rather maintained retracted upwardly so as not to collide with the divider fence.

Once the several compartments of the fiber filling box 50 are individually filled with the appropriate amount, depth and density of fiber material 4, then the multi-axis drives 12 and the fiber feed pipes 13 are retracted out of the way, and the stroke elements 19 are driven to lower the support frame 17, while the stroke elements 14 are preferably also actuated to drive the hold-down plates 3 downwardly onto the accumulated fiber material 4. Preferably at this time the vacuum control belts 7 are fully retracted so as to open the entire area of the fiber filling box to the vacuum suction airflow. By individually controlling or regulating the downward pressure and/or the downward stroke distance or extension of the individual stroke elements 14, thereby each individual portion of fiber material in each respective compartment of the fiber filling box 50 can be subjected to an independently allocated degree of compression to an independently allocated thickness. Namely, the stroke elements 14 are each individually controllable to exert a respective individually controlled downward pressure, and/or to travel downward to a respective individually controlled vertical position or height, so as to individually compress the loose fiber material 4 in the individual compartments of the fiber filling box 50. Thereby, the method using this apparatus achieves a different thickness and/or a different compressed density of the fiber material 4 respectively individually in each one of the compartments of the fiber filling box 50 and thus in each one of the segmented sub-areas of the resulting shaped fiber mass 4E.

At this point in the process, stroke elements 18 (such as pneumatic lift cylinders or any other suitable linear drive elements) are actuated to raise the support frame 16 that carries the fiber filling box 50. During this step, the hold-down plates 3 are maintained in their respective downwardly extended positions and the application of vacuum suction airflow is maintained. Thereby, the fiber material 4 is held down by both the hold-down plates 3 and the vacuum suction airflow, and the fiber material is wiped down from the vertical tines 2A of the comb-like divider fences 2 and from the solid perimeter walls 1 of the fiber filling box 50, so that the box is lifted upwardly without disturbing the resulting shaped fiber mass 4E. The resulting state, with the fiber filling box 50 lifted upwardly, and the hold-down plates 3 still pressing and holding down the fiber material 4, is shown in FIG. 4. It can be seen, as an example, that the fiber fill level in any given compartment of the fiber filling box 50 need not have a continuous uniform depth with a horizontal top surface. Instead, one of the segmented sub-areas or portions 4A of the fiber material 4 has a varying depth with a sloping top surface, which is pressed down by the sloping or tilted hold-down plate 3, which can freely tilt, pivot or swivel at the pivot joint 3B. Such a graded or sloping fill level of the fiber material 4 in a given compartment of the fiber filling box can be achieved by appropriately controlling the fiber feed nozzle 13 during the fiber filling process. For example, the multi-axis drive 12 begins with a faster speed in the Y direction at the right side of the left-most compartment of the fiber filling box as shown in FIGS. 3 and 4, and moves progressively more slowly as it advances toward the left, so that the fiber material fills progressively higher toward the left in this compartment of the fiber filling box. Depending on the final compression and molding of the fiber material in the final molding step, such a varying thickness of the shaped fiber mass 4E can form either a varying thickness or a varying density (or both) of the finished molded fiber component 32.

Figure 5:
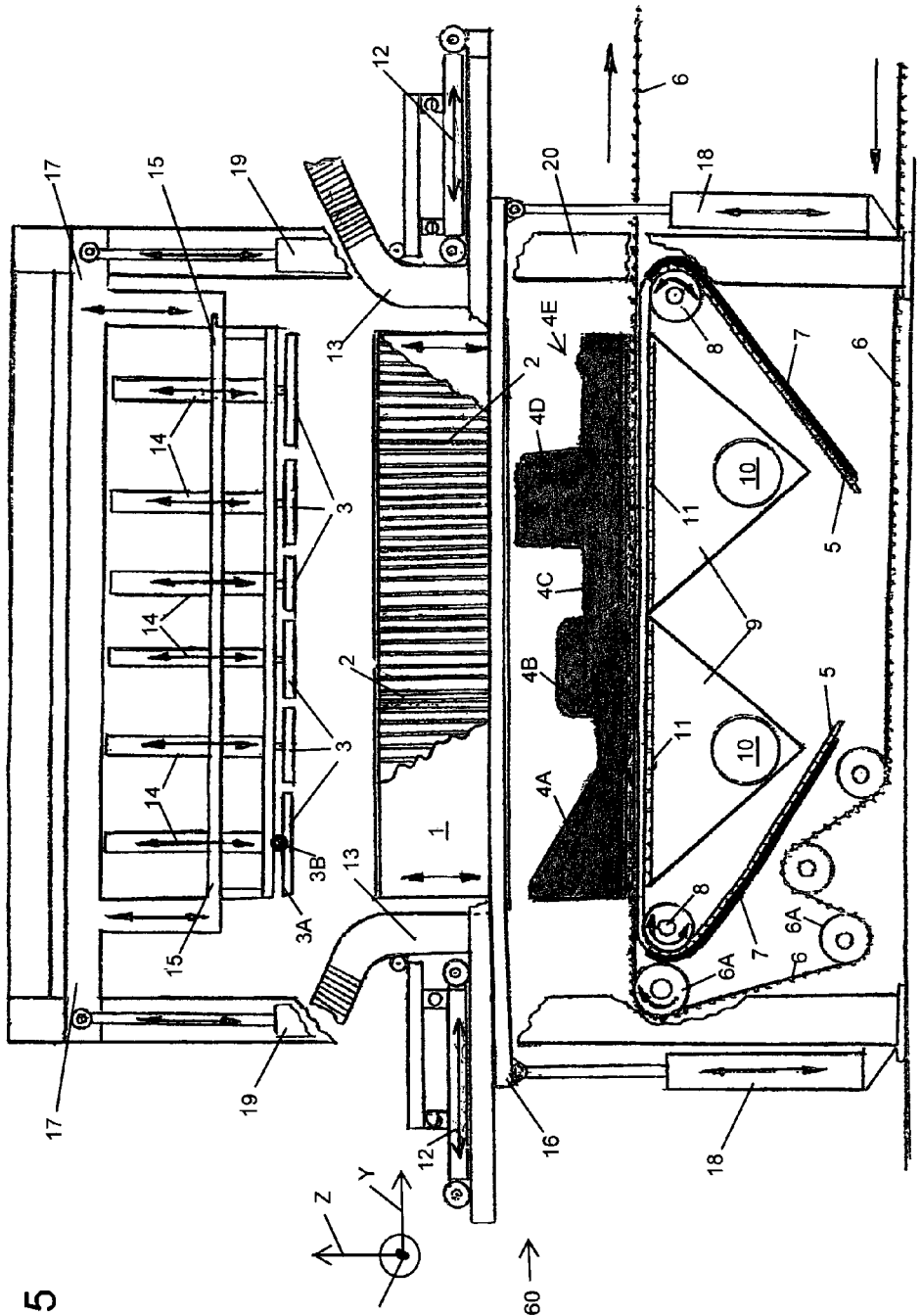
FIG. 5 is a view similar to FIG. 4, but showing a subsequent stage in which the fiber filling box and thereafter the hold-down plates have been retracted upwardly to release the pre-compressed and pre-molded shaped fiber mass.

FIG. 5 shows the transition to the next stage of the process, in which the stroke elements 19 and the stroke elements 14 have been actuated to lift the hold-down plates 3 upwardly away from the resulting shaped fiber mass 4E, which now rests (and preferably is still held by vacuum suction) on the air-permeable conveyor 6. As can be seen in FIG. 5, the shaped fiber mass 4E has different areas or portions 4A, 4B, 4C and 4D with different heights and/or different densities of the fiber material 4. It is significant according to the invention that precise, clean or sharp boundaries are established at the transitions of thickness and/or density of the fiber material in the distinct areas, corresponding to the separate compartments of the fiber filling box 50. In the finished molded fiber component 32, these areas with different thicknesses and/or different densities of the shaped fiber mass 4E will correspond to areas of differing thickness and/or density, depending on the final compression and molding carried out in the final molding step. In other words, for example, differing thickness of the shaped fiber mass 4E can result in an area of different density (rather than different thickness) in the finished molded fiber component 32, if the final molding step provides a different degree of compression of the fiber material at this area.

Figure 6:
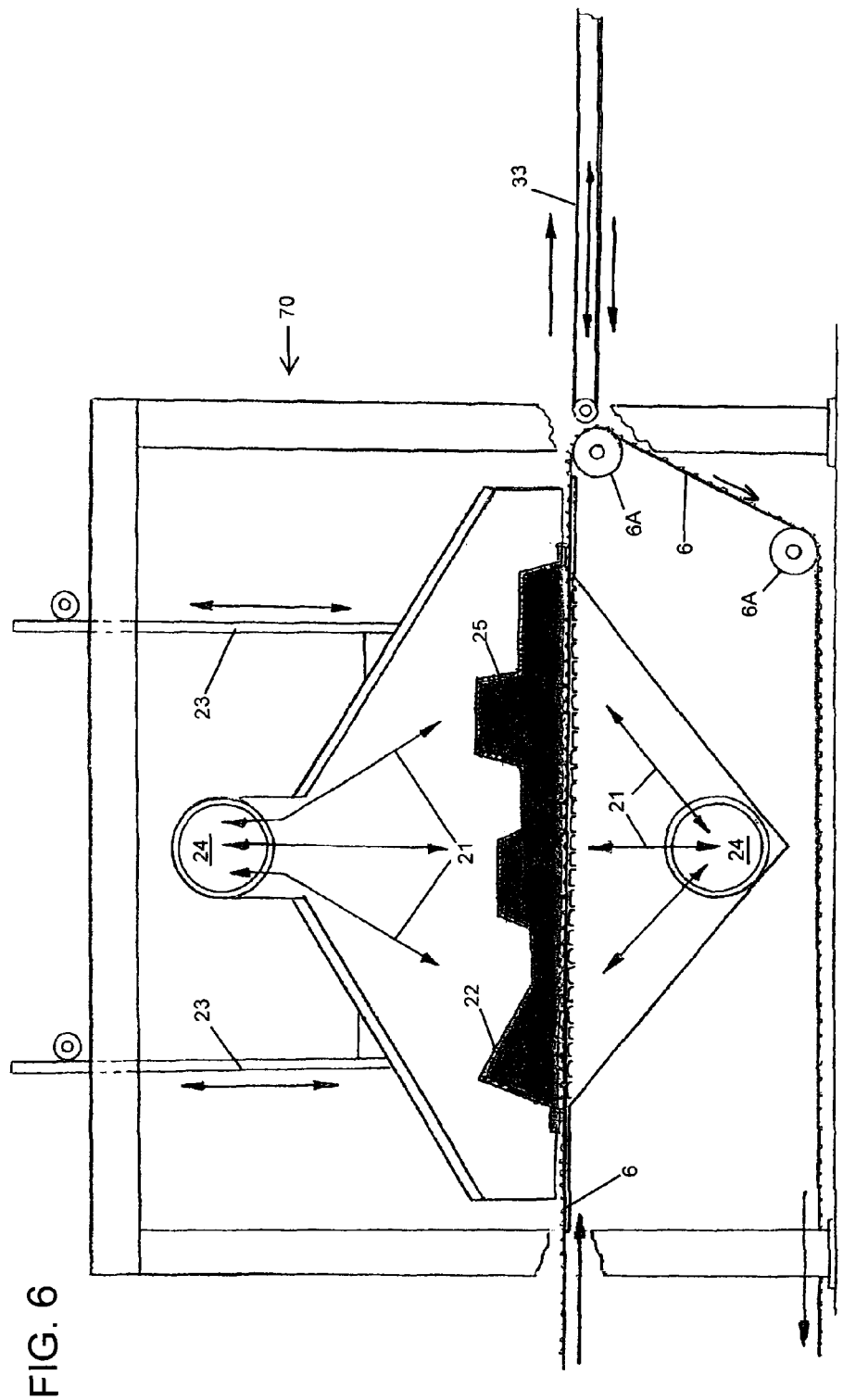
FIG. 6 is a schematic front elevation view of a hot air heating apparatus or station, in which the pre-compressed fiber mass is heated, compressed and shaped to form a hot fiber preform.

Next, after the shaped fiber mass 4E has been prepared as shown in FIG. 5, the air-permeable conveyor 6 is actuated to transport the shaped fiber mass 4E horizontally out of the fiber filling station 60 and into the adjacent hot air oven or heating station 70 as shown in FIG. 6. In this regard, it can be seen that the air-permeable conveyor 6, such as a conveyor belt, extends as a continuous loop through both the fiber filling station 60 and the hot air heating station 70 over a plurality of deflecting rollers 6A. Also, before transporting the shaped fiber mass 4E out of the fiber filling station 60, the application of suction has been discontinued and/or the vacuum control belts 7 have been completely closed to block the application of suction from the vacuum boxes 9 through the air-permeable table plate 11 to the bottom side of the air-permeable conveyor 6. Thus, normal atmospheric pressure prevails through the air-permeable conveyor 6 when the conveyor transports the shaped fiber mass 4E out of the fiber filling station 60 and into the hot air heating station 70.

In the hot air heating station 70 as shown in FIG. 6, a forming and air-heating tool 22 of perforated contoured sheet metal is lowered by a vertical stroke arrangement 23 (which may be any known vertical lifting and lowering stroke arrangement, such as a pneumatic piston-cylinder device, a motor driven gear rack, an acme screw, etc.). The perforated sheet metal tool 22 is preferably shaped with the configuration of the shaped fiber mass 4E, so that the tool 22 holds the shaped fiber mass 4E while also maintaining (or even accentuating or further molding) the established surface contour and differential fiber compression thereof on the stationary air-permeable conveyor 6. The conveyor may be supported from underneath by a perforated support table. Then, hot air 21 at a temperature of about 200° C. for example, from a hot air supply 24, is blown through a plenum above and connected to the perforated tool 22 and/or below the air-permeable conveyor 6 into the shaped fiber mass 4E. The blowing of hot air 21 can be performed only from the top, or only from the bottom, or both from the top and the bottom, or alternately from the top and the bottom, as necessary to achieve sufficient uniform heating throughout the shaped fiber mass 4E. As a result, the fiber material 4 is heated to a temperature at which at least the meltable fiber portion in the fiber mixture at least begins to melt and is thereby activated to serve as a binder for the fiber material. Simultaneously, downward pressure is applied with the vertical stroke drive arrangement 23 via the perforated sheet metal tool 22 so as to compress and mold the top surface of the shaped fiber mass 4E, while the fibers thereof are being hot-melt-adhered together. Then, after the necessary melting temperature and compression has been reached, the perforated sheet metal tool 22 is lifted by actuation of the stroke drive arrangement 23, to release the resulting hot fiber preform 25 that has been formed by hot-melt adhesion of the binder fibers throughout the shaped fiber mass 4E. The air-permeable conveyor 6 is then actuated to transport the hot fiber preform 25 out of the heating station 70 and onto a conveyor arrangement 33, of which the conveyor belt is driven to draw the fiber preform 25 onto the arrangement 33.

Figure 7:
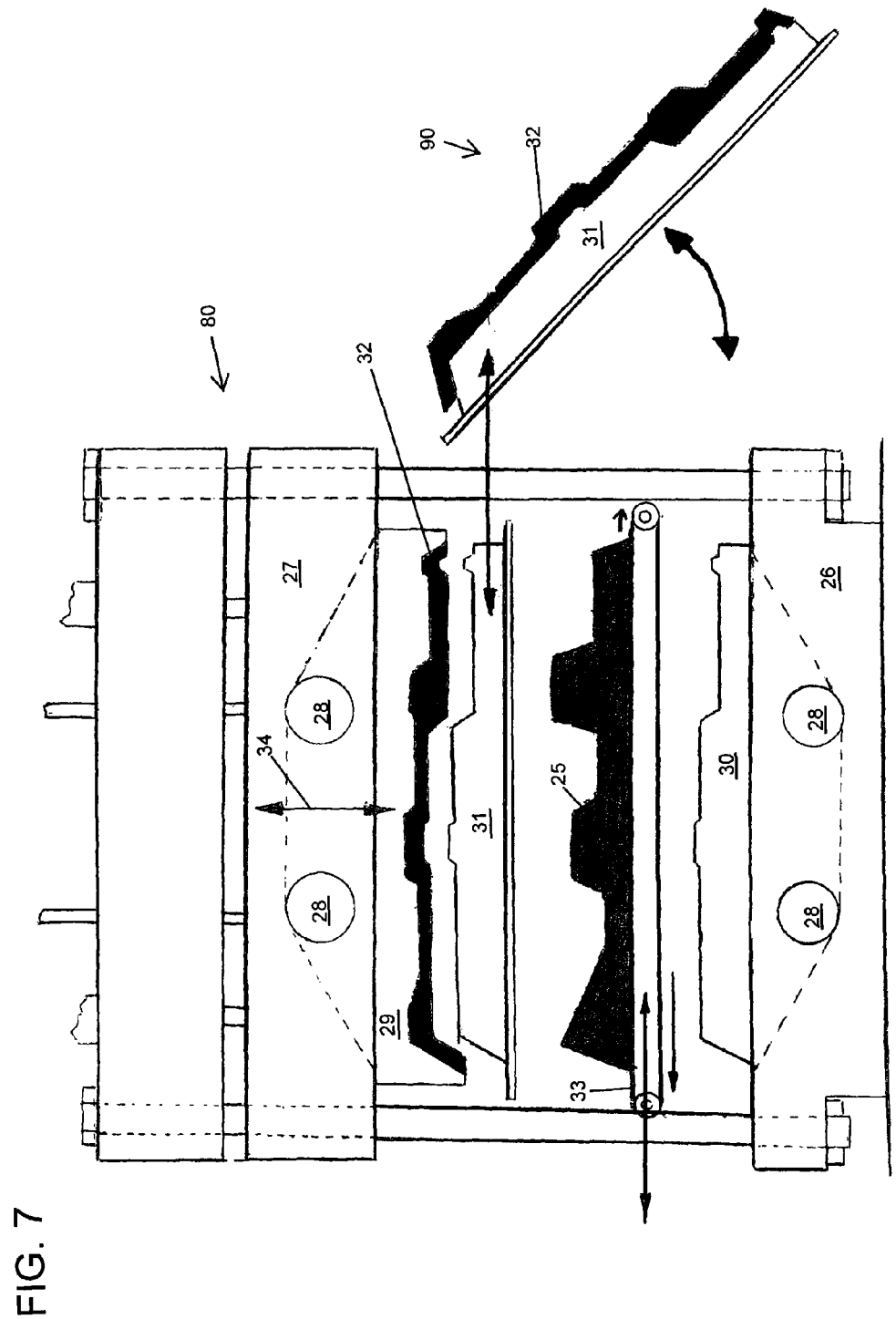
FIG. 7 is a schematic front elevation view of a molding apparatus or station, in which the hot fiber preform is further compressed and shaped, and then cooled to produce the final molded fiber component.

Next, as shown in FIG. 7, the conveyor arrangement 33 is shifted into the next adjacent molding station 80, which comprises an upper press table 27 carrying an upper mold tool 29 and a lower press table 26 carrying a lower mold tool 30. The mold tools are each cooled by a cooling air supply 28 and/or a cooling water supply. Once the fiber preform 25 is on the conveyor belt of the conveyor arrangement 33, the belt is parked (i.e. the belt rollers are stopped), and then the conveyor arrangement 33 including the belt carrier, the belt rollers and the belt is translated horizontally into the molding station 80. In this regard, the conveyor arrangement 33 is first shifted horizontally into the space between the upper mold tool 29 and the lower mold tool 30. Then, the conveyor belt is rotated forward toward the right while the belt carrier is withdrawn horizontally toward the left (in FIG. 7), so as to deposit the still-hot fiber preform 25 onto the lower mold tool 30, as the conveyor arrangement 33 is retracted toward the left out of the molding station 80.

Then the upper press table 27 carrying the upper mold tool 29 is driven (by any suitable vertical driving arrangement) downwardly along a stroke motion 34, so as to engage the fiber preform 25 between the upper mold tool 29 and the lower mold tool 30. Thereby the mold tools further compress and mold the still-hot fiber material of the fiber preform 25 to the final required thickness, shape, contour, and fiber density of the finished molded fiber component 32 that is to be produced. As can be seen in FIG. 7, which depicts several stages of the process in one illustration, the finished molded fiber component 32 is generally thinner, more compressed and thus of higher density, and differently shaped than the fiber preform 25. The final thickness and molded configuration of the molded fiber component 32 relative to that of the fiber preform 25 as well as the thickness and density of the fiber material originally established in the shaped fiber mass 4E, determines the final density and the final thickness in different sub-areas or portions of the finished molded fiber component 32. The left-most portion of the fiber preform 25 as shown in FIGS. 6 and 7 having a sloping upper surface, i.e. a linearly varying thickness, is finally molded to an area of the component 32 that has a flat top surface at least in a portion thereof, as can be seen in FIG. 7. Thereby, while the thickness of this portion is uniform, the fiber density thereof varies linearly due to the linearly sloping or varying thickness of the fiber preform 25 in this area.

The cooled mold tools 29 and 30 remove heat from and thereby cool down the molded fiber component 32 during a brief dwell time during which the mold tools are maintained in the closed position. Thereby, the fiber material is cooled below the softening temperature, so as to set, fix and stabilize the molded configuration of the molded fiber component 32. Then the upper mold tool 29 is again opened by a vertical lifting stroke 34, while picking up the molded fiber component 32 to be retained on the upper mold tool 29. This is preferably achieved by mechanical grippers or holding needles provided on the upper mold tool 29, but can alternatively be achieved by applying vacuum through perforations in the upper mold tool 29. Then a removal or discharge carrier tool 31 is transported horizontally into the mold cavity space below the molded fiber component 32 carried on the upper mold tool 29, as shown in FIG. 7. The molded fiber component 32 is released and deposited onto the removal carrier tool 31, which is then transported horizontally to carry the molded fiber component 32 out of the molding station 80 to the adjacent finished part discharge or removal station 90 as shown in FIG. 7 and FIG. 11. In this station, the removal carrier tool 31 tilts or pivots downwardly to an oblique angle to allow operating personnel of the molding system to easily remove the molded fiber component 32 as depicted in FIG. 11.

Figure 8:
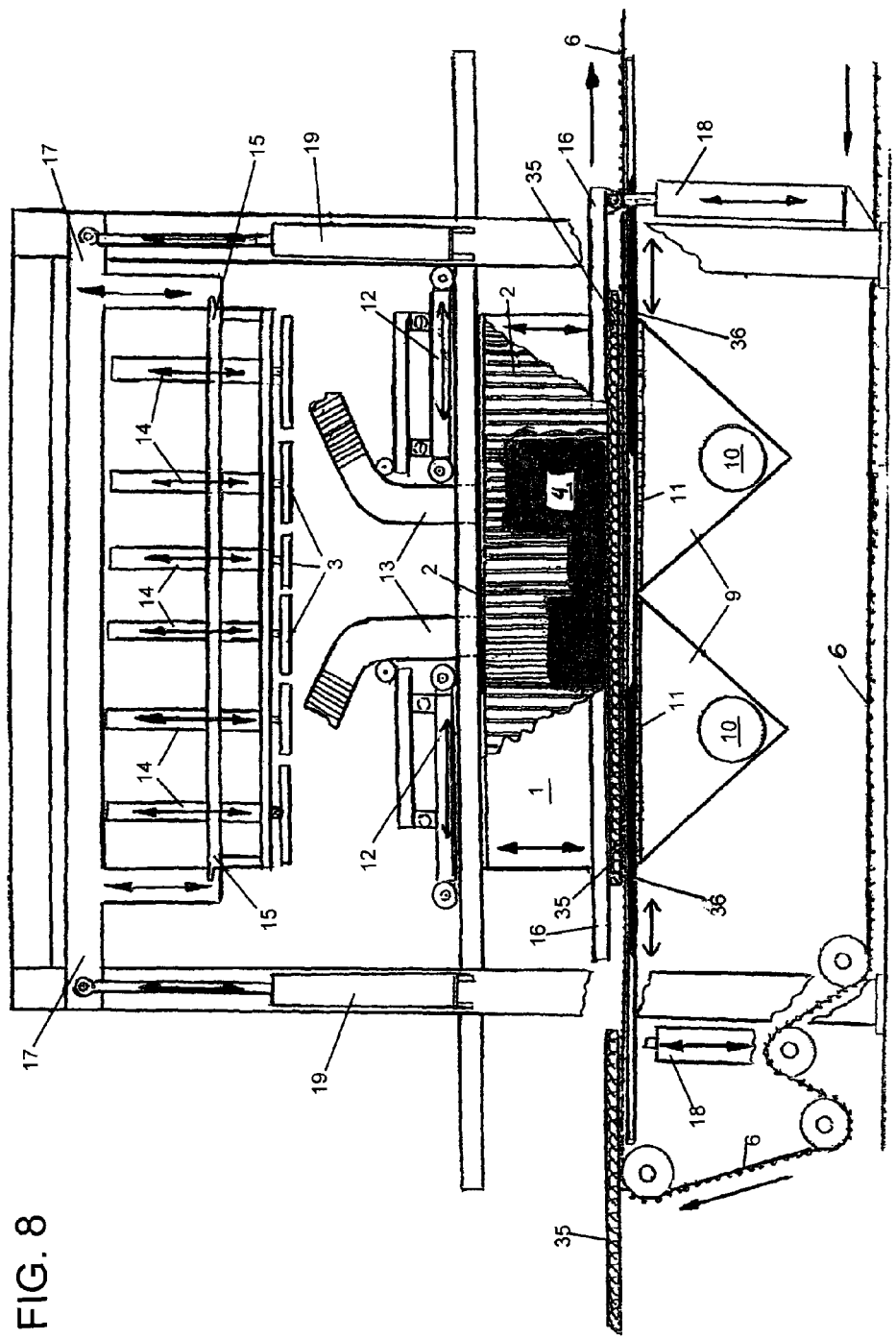
FIG. 8 is a schematic front elevation view similar to FIG. 3, but showing an alternative embodiment using vacuum control slider plates instead of vacuum control belts, and including a pre-fabricated fiber fleece mat as a substrate or base layer onto which the loose fiber material is deposited.
Figure 9:
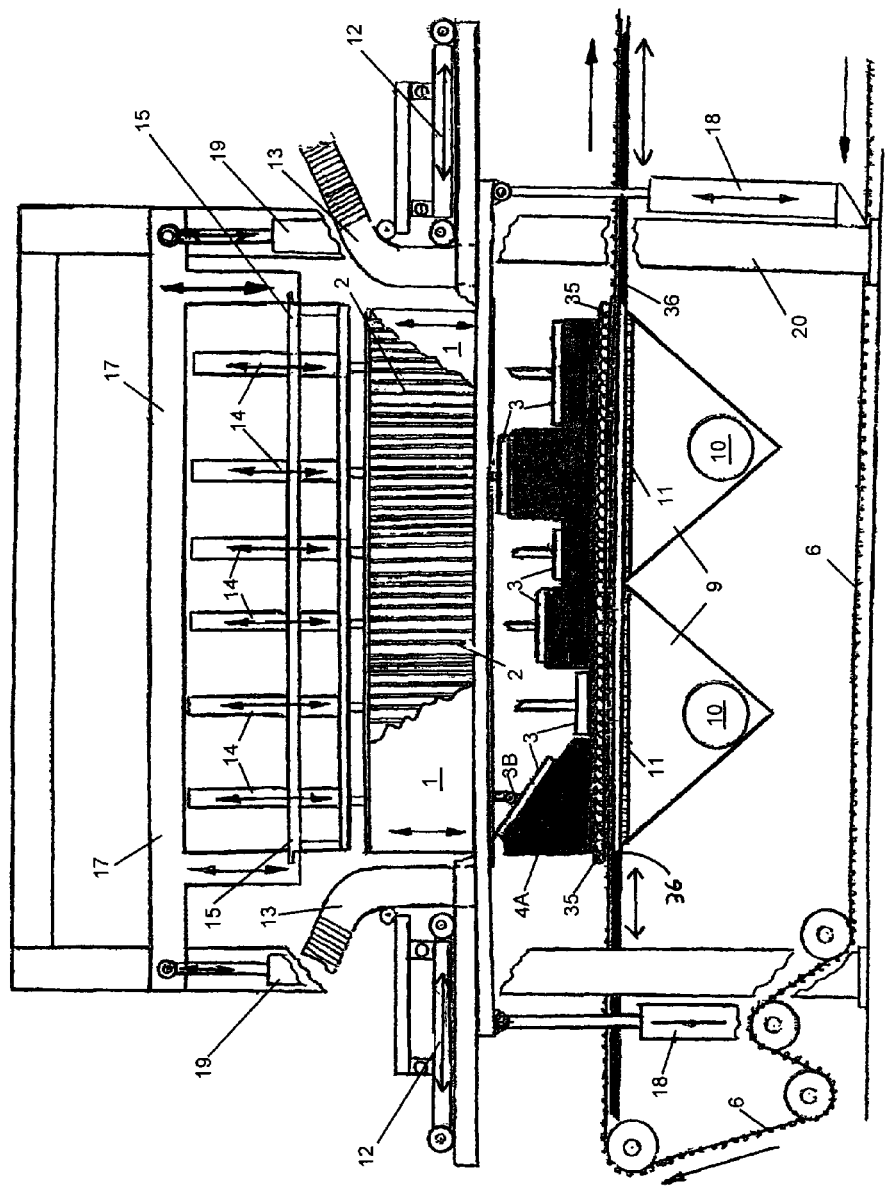
FIG. 9 is a schematic front elevation view similar to FIG. 4, but showing the alternative embodiment according to FIG. 8.
Figure 10:
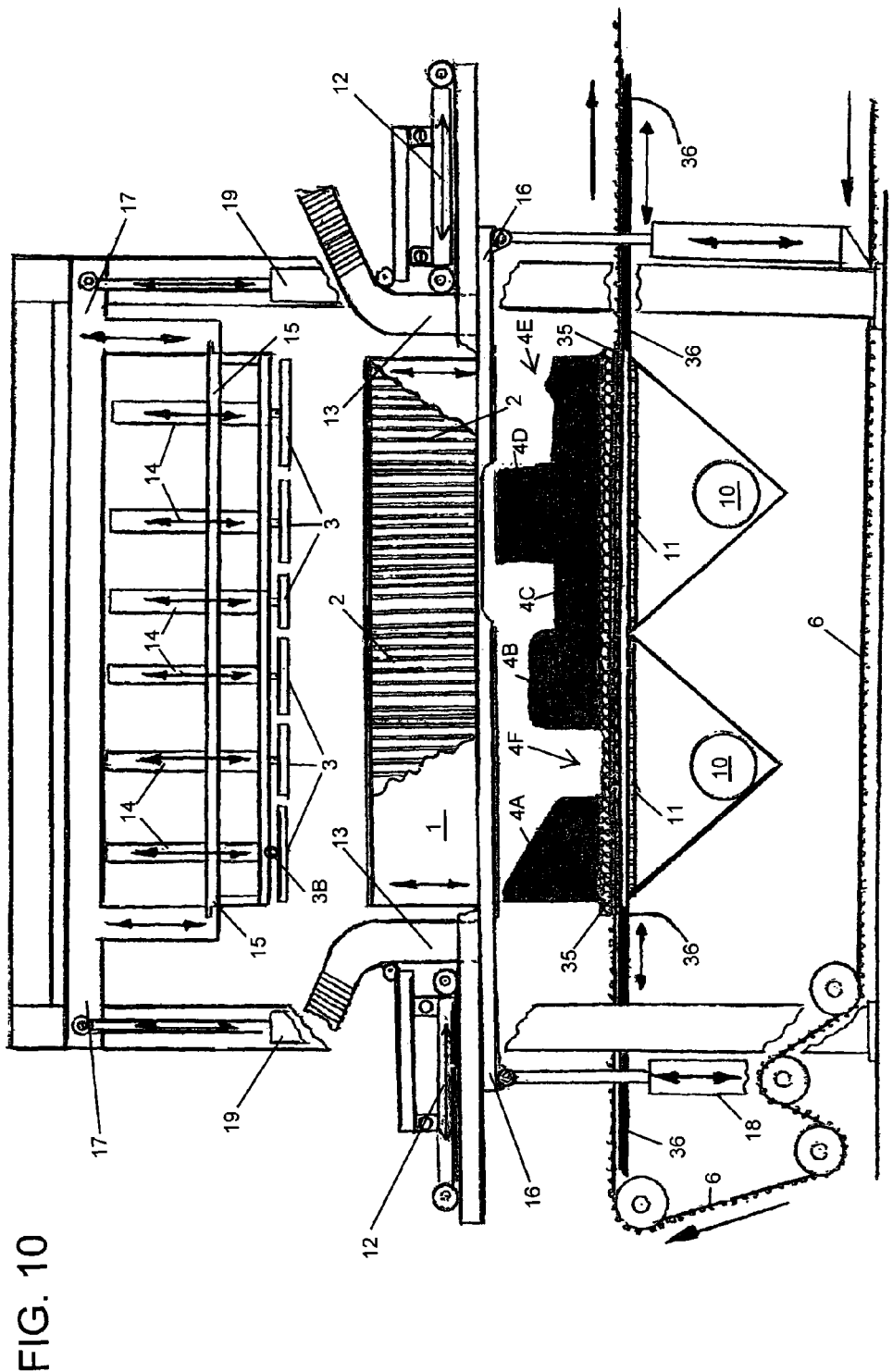
FIG. 10 is a schematic front elevation view similar to FIG. 5, but showing the alternative embodiment according to FIG. 8.

FIGS. 8, 9 and 10 are similar to FIGS. 3, 4 and 5, but show an alternative embodiment of the apparatus and method according to the invention. Most of the components of FIGS. 8 to 10 correspond to those of FIGS. 3 to 5 and are identified by the same reference numbers. The differences will now be described. In FIGS. 3 to 5, the entire shaped fiber mass 4E was formed by filling the loose fiber material 4 into the fiber filling box 50. In contrast, in the alternative embodiment of FIG. 8, a pre-fabricated fiber fleece mat 35 is introduced on the air-permeable conveyor 6 to form a base layer of the shaped fiber mass 4E. Then the fiber filling box 50 is lowered onto the fiber fleece mat 35, rather than being lowered directly onto the conveyor 6. Thus, the loose fiber material 4 is filled and accumulated on top of the fiber fleece mat 35. Thereby, the fiber fleece mat 35 will form the base layer of the fiber preform 25 and of the finished molded fiber component 32. For example, in areas of the molded fiber component 32 having a uniform basic thickness and density of the fiber material, the fiber fleece mat 35 provides the entire fiber material needed in such areas, and it is not necessary to add additional loose fiber material 4 in the compartments of the fiber filling box at such areas. For example, the area 4F of the shaped fiber mass 4E as shown in FIG. 10 has no fiber material 4 filled on top of the mat 35, because the mat 35 provides the entire required thickness of the finished molded component 32 in this area. This feature speeds-up the fiber filling process, because a reduced quantity of loose fiber material 4 needs to be introduced into the fiber filling box 50. This feature also ensures a very consistent thickness and density at all areas formed by only the fiber base mat 35 in the finished molded component 32. Only at areas requiring increased thickness and/or increased density, the loose fiber material 4 is accordingly filled into the allocated compartments of the fiber filling box 50 as described above and then hot-melt bonded with the mat 35 by the molding process.

The fiber fleece mat 35 may have the same fiber composition or a different fiber composition relative to the loose fiber material 4. The mat 35 may also be pre-compressed in order to have a higher fiber density. For example, the fleece mat 35 may have a higher final density, or a higher proportion of the meltable fibers or other binder component, so that the further production steps (heating, molding, cooling) produce the finished molded fiber component 32 with "duodensity" properties including a base layer with a higher density and added-on fiber regions with a lower or varying density, to achieve two-stage acoustic damping or insulation properties, two-stage cushioning properties, or the like.

While FIGS. 3 to 5 provided the vacuum control by means of flexible belts or flexible shutters 7 sliding or rolling along guide rails 5 and over deflection or drive rollers or sprockets 8, the embodiment of FIGS. 8 to 10 instead uses flat vacuum control sliders 36, which may simply be flat sheet metal plates for example. These vacuum control sliders 36 are slidingly moved by means of any suitable actuators (e.g. drive motors, piston-cylinder devices, etc.) to open and close a suction airflow passage through one or more specific areas or portions of the air-permeable conveyor 6, preferably to open the suction airflow passage only in the particular compartment or compartments of the fiber filling box 50 being filled at a given time. Thus, the function and operation of the vacuum control sliders 36 are the same as for the vacuum control belts 7 described above.

The further structure and operation of the apparatus and method according to FIGS. 8 to 10 corresponds to that described above in connection with FIGS. 3 to 5.

The invention has been described above in connection with forming the molded fiber component 32 of a fiber mixture including meltable synthetic plastic fibers, for example in combination with natural fibers or non-meltable plastic fibers or higher-melting plastic fibers. Nonetheless, the invention is also applicable to filling and molding a fiber material mixture that includes any other heat activatable binder such as a spray-on liquid resin binder, or a resin binder with which the fiber material is saturated or mixed. The most significant aspects of the invention relating to the fiber filling station 60 utilizing the fiber filling box 50 also apply just as well to any other such fiber material that can be filled into the fiber filling box with a well-defined varying thickness and/or density.

While FIGS. 3 to 5 and 8 to 10 show the hold-down plates 3 as respective flat planar plates, alternatively any one or more of the hold-down plates 3 can have a three-dimensionally contoured configuration to achieve the required surface configuration of the respective allocated sub-area of the shaped fiber mass 4E.

The downward pressing by the hold-down plates 3 precompresses the loose fiber material 4, thereby increasing the density and reducing the height of the fiber material 4 in the respective individual compartment. If the density and/or the height or thickness of the fiber material in one or more compartments is to be increased after this initial pressing with the hold-down plates 3, then the hold-down plates are retracted upwardly and additional fiber material 4 is filled into the respective compartment or compartments by the fiber feed nozzles 13. Then the pressing cycle of the hold-down plates 3 is repeated. This process of filling additional fiber material and then again pressing the fiber material in the fiber filling box 50 can be repeated as needed to achieve the required increased fiber density and thickness of the fiber material in any one or more of the compartments of the box.

Throughout the drawings, arrows represent motion or possible motion of respective components.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. The abstract of the disclosure does not define or limit the claimed invention, but rather merely abstracts certain features disclosed in the application.

What is claimed is:

1. A fiber filling apparatus comprising:
    a support;
    a movable fiber filling box adapted and arranged to be selectively lowered toward and lifted upwardly away from said support, wherein said fiber filling box has an open top, an open bottom, perimeter walls bounding a perimeter thereof, and at least one vertically slotted divider wall that divides, into at least two compartments, an interior space of said fiber filling box bounded within said perimeter walls, wherein said divider wall has vertically extending slot openings and vertically extending divider elements that alternate with one another horizontally along said divider wall, and wherein said slot openings are open to said open bottom of said fiber filling box; and
    a fiber supply movably arranged above said fiber filling box and adapted to supply a loose fiber material into said compartments of said fiber filling box;
    wherein said at least one divider wall is configured and dimensioned to permit some cross-over of fibers of said loose fiber material between adjacent ones of said compartments through said vertically extending slot openings while sufficiently bounding said loose fiber material to maintain different thicknesses and/or densities of said loose fiber material respectively in said compartments.

2. The fiber filling apparatus according to claim 1, wherein said divider wall is a divider fence comprising a horizontal top frame and vertical tines extending vertically downwardly from said horizontal top frame, wherein said tines are spaced apart from one another horizontally with said slot openings therebetween.

3. The fiber filling apparatus according to claim 1, wherein said perimeter walls are imperforate walls.

4. The fiber filling apparatus according to claim 1, wherein said support is an air-permeable support, and further comprising at least two vacuum chambers arranged below said air-permeable support and respectively connected to at least two sources of vacuum suction airflow so as to be adapted to apply said vacuum suction airflow to said air-permeable support from below.

5. The fiber filling apparatus according to to claim 4, further comprising at least two vacuum control members that are arranged respectively between said air-permeable support and said at least two vacuum chambers, and that are slidable so as to adjust areas of said air-permeable support above said at least two vacuum chambers to which said vacuum suction airflow is applied.

6. The fiber filling apparatus according to claim 5, wherein said vacuum control members are imperforate flat metal sheets or plates that are slidable along a flat plane between said air-permeable support and said vacuum chambers and that always remain on said plane.

7. The fiber filling apparatus according to claim 5, wherein said vacuum control members are imperforate flexible sheets of metal or plastic that are slidable along a flat plane between said air-permeable support and said vacuum chambers, and further comprising at least one of rollers, sprockets and curved tracks on which said flexible sheets are flexed and deflected out of said plane.

8. The fiber filling apparatus according to claim 4, wherein said air-permeable support comprises a movable air-permeable conveyor.

9. The fiber filling apparatus according to claim 1, further comprising a fiber filling apparatus machine frame to which said support is vertically immovably connected, and a first lift arrangement connected to said machine frame and to said fiber filling box and adapted to lift and lower said fiber filling box relative to said support.

10. The fiber filling apparatus according to claim 9, further comprising:
    a plurality of hold-down members adapted and arranged to be selectively lowered toward and lifted away from said fiber material in said compartments of said fiber filling box whereby said hold-down members are adapted to compress said fiber material and hold down said fiber material before, while and after said fiber filling box is lifted away from said support and said fiber material, and
    a second lift arrangement connected to said machine frame and to said hold-down members and adapted to lift and lower said hold-down members relative to said support.

11. The fiber filling apparatus according to claim 10, wherein said second lift arrangement comprises:
    a vertically movable support frame,
    at least two vertical stroke drives that are connected to said support frame and to said machine frame, and that are adapted to lower and lift said support frame relative to said machine frame, and
    a plurality of individual stroke drives that are connected to said support frame and individually to said hold-down members, and that are adapted to individually lower and lift said hold-down members relative to said support frame.

12. The fiber filling apparatus according to claim 11, further comprising an exchangeable frame which is removably connected to said support frame and to which said individual stroke drives are connected, whereby said hold-down members and said individual stroke drives are removably and exchangeably mounted to said support frame by said exchangeable frame.

13. The fiber filling apparatus according to claim 10, wherein said hold-down members are respectively individually allocated to and individually configured corresponding to respective plan shapes of individual ones of said compartments of said fiber filling box.

14. The fiber filling apparatus according to claim 10, wherein said hold-down members are respective flat planar hold-down plates.

15. The fiber filling apparatus according to claim 10, further comprising at least one pivot joint by which at least one of said hold-down members is pivotably connected to said second lift arrangement.

16. The fiber filling apparatus according to claim 10, wherein at least one of said hold-down members has a non-planar three-dimensionally contoured downwardly-facing surface.

17. The fiber filling apparatus according to claim 10, wherein said hold-down members all respectively have the same size and the same shape as one another, said hold-down members are arranged in a raster grid pattern, and a plurality of said hold-down members are allocated to at least one single one of said compartments of said fiber filling box.

18. The fiber filling apparatus according to claim 1, wherein said fiber supply comprises at least one fiber feed pipe through which said loose fiber material is to be supplied entrained in a conveying airstream, and at least one multi-axis drive that is connected to said fiber feed pipe and that is adapted to controlledly move said fiber feed pipe along at least two axes over said fiber filling box so as to supply said loose fiber material into said compartments of said fiber filling box with a controlled density and/or thickness of said fiber material.

19. A combination comprising the fiber filling apparatus according to claim 1, and said fiber material filled into a plurality of said compartments with different thicknesses and/or densities of said fiber material respectively in different ones of said compartments, and with some cross-over of fibers of said fiber material between adjacent ones of said compartments through said vertically extending slot openings of said divider wall.

20. The combination according to claim 19, wherein at least one of said compartments has none of said fiber material filled therein so as to form a through-hole in a shaped fiber mass of said fiber material filled into said fiber filling box.

21. The combination according to claim 19, further comprising a pre-fabricated fiber fleece mat arranged on top of said support and extending continuously under said fiber filling box and said fiber material therein.

22. A system for producing a molded fiber component, comprising said fiber filling apparatus according to claim 1, and further comprising:
  a hot air heating station arranged adjacent to said fiber filling apparatus, wherein said support of said fiber filling apparatus is an air-permeable conveyor that extends into said hot air heating station and that is adapted to transport a shaped fiber mass of said fiber material from said fiber filling station into said hot air heating station, which comprises a perforated sheet metal forming tool that is movably arranged above said air-permeable conveyor and that is connected to a source of hot air and adapted to blow said hot air through said shaped fiber mass and to three-dimensionally form or hold said shaped fiber mass, so as to form a hot fiber preform from said shaped fiber mass;
  a molding station including a forming press having a cooled upper mold tool and a cooled lower mold tool; and
  a second conveyor arranged and adapted to transport said hot fiber preform into said forming press between said upper and lower mold tools;
  wherein said upper and lower mold tools are adapted to compress, mold and cool said hot fiber preform therebetween so as to form of said hot fiber preform a molded fiber component having different thicknesses and/or different densities at different sub-areas thereof; and
  wherein said compartments of said fiber filling box are configured corresponding to and are allocated to said sub-areas of said molded fiber component to be produced.

23. A method of using the fiber filling apparatus according to claim 10 to form a shaped fiber mass, comprising the steps:
  a) placing said fiber filling box on top of said support;
  b) filling said loose fiber material into at least two of said compartments of said fiber filling box with different thicknesses and/or different densities of said fiber material respectively in said compartments, and with some cross-over and intertwining of fibers of said fiber material between adjacent ones of said compartments through said vertically extending slot openings, while said at least one divider wall sufficiently bounds said fiber material to maintain said different thicknesses and/or said different densities of said fiber material respectively in said compartments;
  c) pressing said hold-down members down onto said fiber material in said compartments;
  d) while continuing said step c), actuating said first lift arrangement to lift said fiber filling box up away from said fiber material; and
  e) after said step d), actuating said second lift arrangement to lift said hold-down members up away from said fiber material, to form of at least said fiber material on top of said support a shaped fiber mass having sub-areas, corresponding to said compartments, with different thicknesses and/or different densities of said fiber material.

24. The method according to claim 23, further comprising placing a pre-fabricated fiber fleece mat between said support and said fiber filling box before said step a), wherein said filling of said step b) fills said fiber material on top of said fiber fleece mat, and said fiber fleece mat is a part of said shaped fiber mass in said step e).

25. The method according to claim 23, wherein none of said fiber material is filled into at least a selected one of said compartments, so as to form a through-hole through said shaped fiber mass at an area of said selected compartment.

26. The method according to claim 23, wherein said support is an air-permeable support, further comprising, during at least said step b), applying a vacuum suction airflow independently to at least two partial areas of a bottom of said air-permeable support, and controlling respective portions of said two partial areas through which said vacuum suction airflow may flow by sliding two vacuum control shutters selectively along said two partial areas.

* * * * *